US010768374B2

(12) United States Patent
Gurreri et al.

(10) Patent No.: US 10,768,374 B2
(45) Date of Patent: Sep. 8, 2020

(54) INDOOR HYBRID CONNECTIVITY SYSTEM FOR PROVIDING BOTH ELECTRICAL POWER AND FIBER OPTIC SERVICE

(71) Applicant: CommScope Technologies LLC, Hickory, NC (US)

(72) Inventors: Michael Lawrence Gurreri, York, PA (US); Robert Charles Flaig, Lancaster, PA (US); Dwight A. Bretz, Hummelstown, PA (US); Eric Ryan Chappell, Statesville, NC (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

(21) Appl. No.: 15/546,569

(22) PCT Filed: Jan. 26, 2016

(86) PCT No.: PCT/US2016/014955
§ 371 (c)(1),
(2) Date: Jul. 26, 2017

(87) PCT Pub. No.: WO2016/123124
PCT Pub. Date: Aug. 4, 2016

(65) Prior Publication Data
US 2018/0031775 A1 Feb. 1, 2018

Related U.S. Application Data
(60) Provisional application No. 62/107,886, filed on Jan. 26, 2015.

(51) Int. Cl.
G02B 6/38 (2006.01)
(52) U.S. Cl.
CPC ......... G02B 6/3817 (2013.01); G02B 6/3821 (2013.01); G02B 6/3825 (2013.01);
(Continued)

(58) Field of Classification Search
CPC .. G02B 6/3817; G02B 6/3821; G02B 6/3869; G02B 6/3879; G02B 6/3893; G02B 6/3825
See application file for complete search history.

(56) References Cited

U.S. PATENT DOCUMENTS 5,234,353 A 8/1993 Scholz et al.
5,268,983 A 12/1993 Tatarka et al.
(Continued)

FOREIGN PATENT DOCUMENTS

EP 1 199 587 A1 4/2002
GB 2 289 140 A1 11/1995
(Continued)

OTHER PUBLICATIONS

International Search Report and Written Opinion of the International Searching Authority for corresponding International Patent Application No. PCT/US2016/014955 dated May 23, 2016, 10 pages.
(Continued)

Primary Examiner — Ryan A Lepisto
Assistant Examiner — Erin D Chiem
(74) Attorney, Agent, or Firm — Merchant & Gould P.C.

(57) ABSTRACT

A hybrid optical and electrical connection system includes a fiber optic connector; and a connector contact holder. The connector includes a connector body defining a forward plug end, a ferrule, a spring that biases the ferrule in a forward direction, and a rear piece that retains the spring within the connector body. The connector contact holder includes an attachment portion that attaches to the fiber optic connector, a lateral offset portion that extends laterally outwardly from the fiber optic connector and a forward extension structure that projects forwardly from the lateral offset portion toward the forward plug end of the connector body. The forward (Continued)

extension structure includes connector contact mounts. Connector electrical contacts are held by the connector contact mounts.

2 Claims, 10 Drawing Sheets

(52) U.S. Cl.
CPC ......... *G02B 6/3869* (2013.01); *G02B 6/3879* (2013.01); *G02B 6/3893* (2013.01)

(56) References Cited

U.S. PATENT DOCUMENTS

| | | | |
|---|---|---|---|
| 5,317,663 A | 5/1994 | Beard et al. | |
| 5,419,717 A | 5/1995 | Abendschein et al. | |
| 5,970,196 A | 10/1999 | Greveling et al. | |
| 6,367,984 B1 * | 4/2002 | Stephenson | G02B 6/3825 385/53 |
| 6,464,520 B2 * | 10/2002 | Saba | F02M 35/10222 439/191 |
| 6,543,941 B1 | 4/2003 | Lampert | |
| 6,588,938 B1 | 7/2003 | Lampert et al. | |
| 6,597,844 B1 | 7/2003 | Witt et al. | |
| 6,813,421 B2 | 11/2004 | Lail et al. | |
| 6,876,798 B2 | 4/2005 | Triplett et al. | |
| 8,509,422 B2 | 8/2013 | Wang et al. | |
| 9,459,411 B2 | 10/2016 | Smith et al. | |
| 2010/0296779 A1 | 11/2010 | Lu et al. | |
| 2011/0243567 A1 | 10/2011 | Su et al. | |
| 2011/0262077 A1 | 10/2011 | Anderson et al. | |
| 2011/0311187 A1 | 12/2011 | Wang et al. | |
| 2012/0039571 A1 | 2/2012 | Ciechomski et al. | |
| 2012/0302104 A1 | 11/2012 | Wu | |
| 2013/0202254 A1 | 8/2013 | Gurreri et al. | |

FOREIGN PATENT DOCUMENTS

| | | |
|---|---|---|
| WO | 2013/189370 A2 | 12/2013 |
| WO | 2014/126975 A1 | 8/2014 |
| WO | 2014/197103 A2 | 12/2014 |
| WO | 2016/063135 A2 | 4/2016 |

OTHER PUBLICATIONS

"Cloudsplitter—Ethernet and Power Technology", TE Connectivity, 4 pages (2014).

"New product Development and Product advancement—At the speed of light, from Concept, Design, Tooling, Testing and Mass Production", SENKO Advanced Components, 40 pages (2014).

"CloudSplitter Hybrid Fiber Power Concept", TE Connectivity, 4 pages (2014).

* cited by examiner

INDOOR HYBRID CONNECTIVITY SYSTEM FOR PROVIDING BOTH ELECTRICAL POWER AND FIBER OPTIC SERVICE

CROSS-REFERENCE TO RELATED APPLICATION

This application is a National Stage Application of PCT/US2016/014955, filed on Jan. 26, 2016, which claims the benefit of U.S. Patent Application Ser. No. 62/107,886, filed on Jan. 26, 2015, the disclosures of which are incorporated herein by reference in their entireties. To the extent appropriate, a claim of priority is made to each of the above disclosed applications.

TECHNICAL FIELD

The present disclosure relates generally to connection systems for telecommunications networks. Particularly, the present disclosure relates to connection systems capable of accommodating both optical signals and electrical power.

BACKGROUND

In today's telecommunications market there is growing demand to support active devices such as fixed location transceivers for generating wireless communication coverage areas (e.g., Wi-Fi access points, macrocells, microcells, picocells, femtocells, other cell sizes, wireless hot spots, nodes, etc.), power-over-Ethernet extenders, and IP devices (e.g., digital cameras such as security cameras, computing devices, etc.). There is also desire to support such devices with faster transmission rates, higher power and longer spans. To achieve faster transmission rates, it is desirable to support such active devices using an optical fiber network. However, traditional fiber optic networks are generally passive (e.g., passive optical local area networks (POLAN), fiber-to-the-home (FTTH), fiber-to-the-desk (FTTD), fiber-to-the-node (FTTN), fiber-to-the-curb (FTTC) and other network architectures) and therefore do not provide ready access to power. Thus, there is a need to support active devices with both electrical power and optical signals in a cost-effective manner. There is also a need to integrate hybrid connectivity (e.g., both power and fiber optics) into existing fiber optic networks.

SUMMARY

One aspect of the present disclosure relates to a hybrid connection system capable of providing connectivity for both fiber optics and electrical power. In certain examples, systems in accordance with the principles of the present disclosure can utilize aspects of existing connector technology to enhance speed-to-market and to facilitate customer acceptance. In certain examples, connection systems in accordance with the principles of the present disclosure can build upon existing connector technology to reduce costs and enhance modularity and compatibility.

One aspect of the present disclosure relates to a hybrid optical and electrical connection system. The system includes a fiber optic connector including a connector body defining a forward plug end. A ferrule is mounted within the connector body. The ferrule has a ferrule end face accessible at the forward plug end of the connector body. A spring biases the ferrule in a forward direction relative to the connector body and a rear piece is secured to a rear end of the connector body for retaining the spring within the connector body. The system also includes a connector contact holder that attaches to the fiber optic connector. The connector contact holder includes an attachment portion that attaches to the fiber optic connector, a lateral offset portion that extends laterally outwardly from the fiber optic connector and a forward extension structure that projects forwardly from the lateral offset portion toward the forward end of the connector body. The forward extension structure includes connector contact mounts. The system further includes connector electrical contacts held by the connector contact mounts. In certain examples, the connector electrical contacts can be held within the connector contact mounts by a snap-fit connection. In certain examples, the connector electrical contacts can include contact pins or contact sockets. In certain examples, the fiber optic connector is an SC-type connector. In certain examples, the attachment portion of the connector contact holder mounts behind the connector body and fits over a rear extension of the rear piece of the fiber optic connector.

In certain examples, the hybrid optical and electrical connection system also includes a fiber optic adapter defining an adapter port for receiving the forward plug end of the fiber optic connector. The hybrid optical and electrical connection system further includes an adapter contact holder including an attachment portion that attaches to the fiber optic adapter, a lateral offset portion that projects laterally outwardly from the fiber optic adapter, and an axial extension structure that extends from the lateral offset portion toward an open end of the adapter port. The axial extension structure of the hybrid optical and electrical connection system includes adapter contact mounts. Adapter electrical contacts are mounted at the adapter contact mounts of the axial extension structure. The connector electrical contacts connect with the adapter electrical contacts when the fiber optic connector is inserted into the adapter port of the fiber optic adapter.

A further aspect of the present disclosure relates to a hybrid optical and electrical connection system including a duplex connector arrangement including two plugs. Each of the plugs includes: a connector body defining a forward plug end; a ferrule mounted within the connector body with a ferrule end face accessible at the plug end of the connector body; and a spring that biases the ferrule in a forward direction. The system also includes a connector contact holder that attaches to the duplex connector arrangement. The connector contact holder includes an attachment portion that attaches to the duplex connector arrangement, a lateral offset portion that extends laterally outwardly from the duplex connector arrangement and a forward extension structure that projects forwardly from the lateral offset portion toward the forward plug ends of the connector bodies of the duplex connector arrangement. The forward extension structure includes connector contact mounts that receive connector electrical contacts held by the connector contact mounts. In certain examples, the hybrid optical and electrical connection system also includes a duplex fiber optic adapter defining adapter ports for receiving the forward ends of the duplex connector arrangement. The hybrid optical and electrical connection system further includes an adapter contact holder that attaches to the duplex fiber optic adapter and that includes adapter electrical contacts that electrically connect with the connector electrical contacts when the plugs of the duplex connector arrangement are inserted into the adapter ports of the duplex fiber optic adapter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
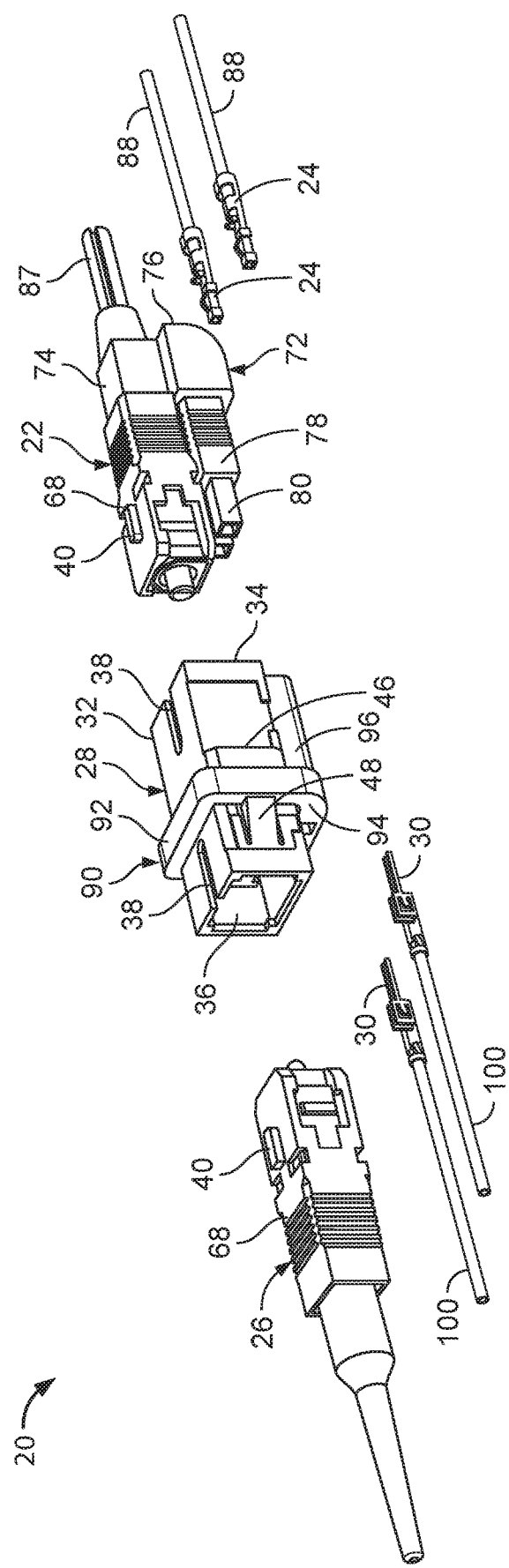
FIG. 1 illustrates a hybrid connection system in accordance with the principles of the present disclosure; the hybrid connection system includes fiber optic connectors at least one of which carries connector electrical contacts, and a fiber optic adapter having adapter electrical contacts secured thereto.
Figure 2:
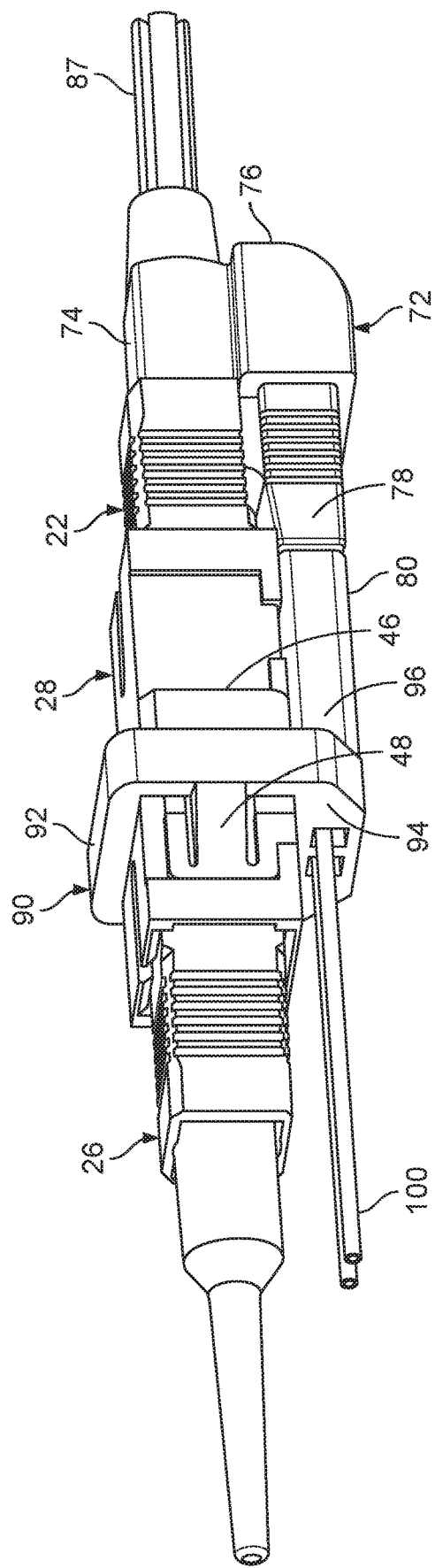
FIG. 2 illustrates the hybrid connection system of FIG. 1 with the fiber optic connectors inserted within ports of the fiber optic adapter and with the connector and adapter electrical contacts connected together.

FIG. 1 illustrates a hybrid optical and electrical connection system 20 in accordance with the principles of the present disclosure. The hybrid optical and electrical connection system 20 includes a first fiber optic connector 22 that carries connector electrical contacts 24. The hybrid optical and electrical connector system 20 also includes a second fiber optic connector 26 and a fiber optic adapter 28 configured to couple the first and second fiber optic connectors 22, 26 such that optical signals can be transmitted between the fiber optic connectors 22, 26. The fiber optic adapter 28 supports adapter electrical contacts 30 that connect to the connector electrical contacts 24 when the first fiber optic connector 22 is mated with the fiber optic adapter 28. FIG. 2 shows the first and second fiber optic connectors 22, 26 coupled together by the fiber optic adapter 28 and the connector electrical contacts 24 electrically connected to the adapter electrical contacts 30.

Figure 3:
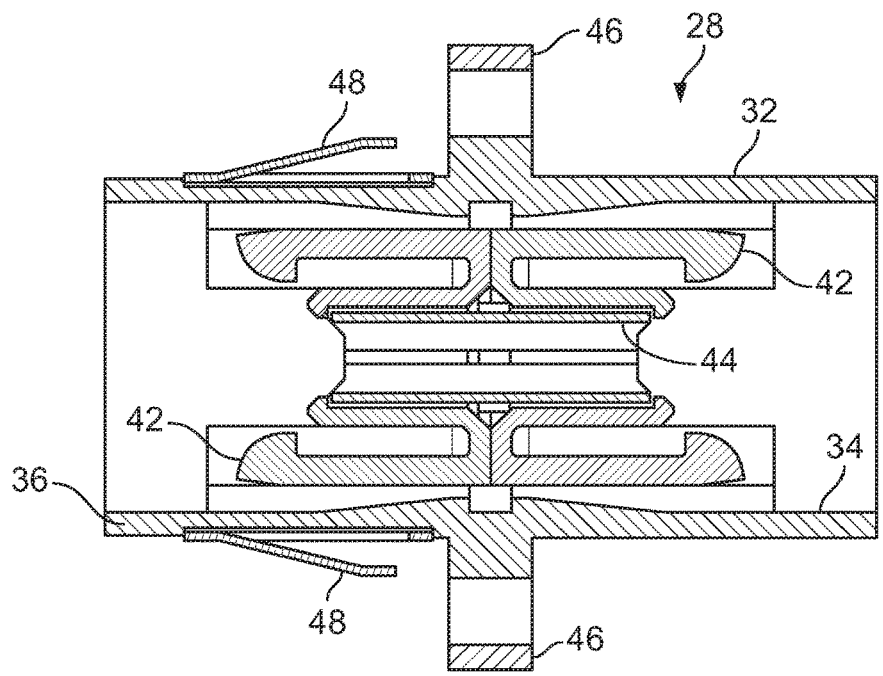
FIG. 3 is a cross-sectional view of the fiber optic adapter of FIG. 1.

In the example system of FIGS. 1 and 2, the fiber optic adapter 28 includes an adapter body 32 that can be an SC-type adapter body. The adapter body 32 defines a first port 34 for receiving the first fiber optic connector 22 and a second port 36 for receiving the second fiber optic connector 26. The adapter body 24 can define keying slots 38 configured to receive keying rails 40 of the first and second fiber optic connectors 22, 26. The fiber optic adapter 28 can also include internal latches 42 (see FIG. 3) for latching the first and second fiber optic connectors 22, 24 in their respective ports 34, 36, and an alignment sleeve 44 for coaxially aligning ferrules of the first and second fiber optic connectors 24, 26. The adapter body 32 also includes an external shoulder 46 and a spring-structure such as a leaf-spring structure 48 positioned adjacent to the external shoulder 46.

Figure 8:
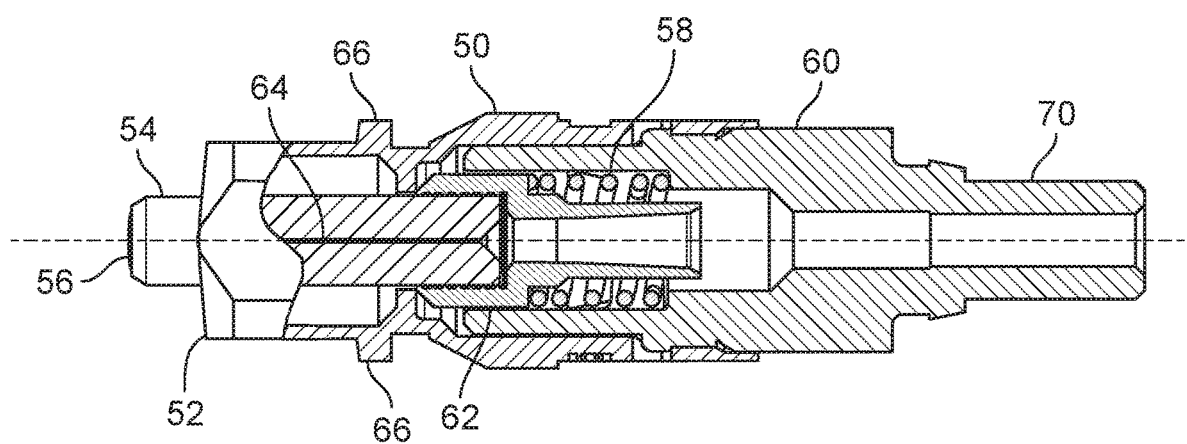
FIG. 8 is a cross-sectional view showing a connector body, a ferrule, ferrule hub, a spring, and a rear spring retainer of the fiber optic connectors of FIG. 1.

Referring to FIG. 8, first and second fiber optic connector 24, 26 each include a connector body 50 defining a forward plug end 52. The connector body 50 can be an SC-type connector body. A ferrule 54 is mounted within the connector body 50 with a ferrule end face 56 accessible at the forward plug end 52 of the connector body 50. A spring 58 biases the ferrule 54 in a forward direction relative to the connector body 50. A rear piece 60 is secured to a rear end of the connector body 50 and functions to retain the spring 58 within the connector body 50. A base end of the ferrule 54 is supported within a ferrule hub 62. The spring 58 is compressed between a forwardly facing shoulder of the rear piece 60 and a rearwardly facing shoulder of the ferrule hub 62. The ferrule 54 defines a central passage 64 for receiving optical fiber of a fiber optic cable to which the corresponding fiber optic connector 22, 24 is terminated. In certain examples, optical fiber can be potted within the central passage 64 and can have a polished end face located at the ferrule end face 56.

Still referring to FIG. 8, the connector body 50 also includes shoulders 66 that are engaged by the latches 42 of the fiber optic adapter 28 when the fiber optic connectors 22, 26 are inserted within their respective ports 34, 36. The fiber optic connectors 22, 26 also include outer release sleeves 68 on which the keying rails 40 are provided. The release sleeve 68 can move axially relative to the connector body 50 for at least a limited range of axial movement. The release sleeves 68 are configured for disengaging the latches 42 from the shoulder 66 to allow the connectors 22, 26 to be removed from their respective ports 34, 36. For example, to remove one of the connectors 22 26 from its respective port 34, 36, the corresponding release sleeve 68 is pulled back causing the latches 42 to flex away from the shoulder 66 such that the connector 22, 26 can be removed from its respective port.

Referring still to FIG. 8, the rear piece 60 includes a rear extension 70. The rear extension 70 is aligned with a central longitudinal axis of the connector body 50. In certain examples, the rear extension 70 projects rearwardly beyond the rear end of the connector body 50.

Figure 4:
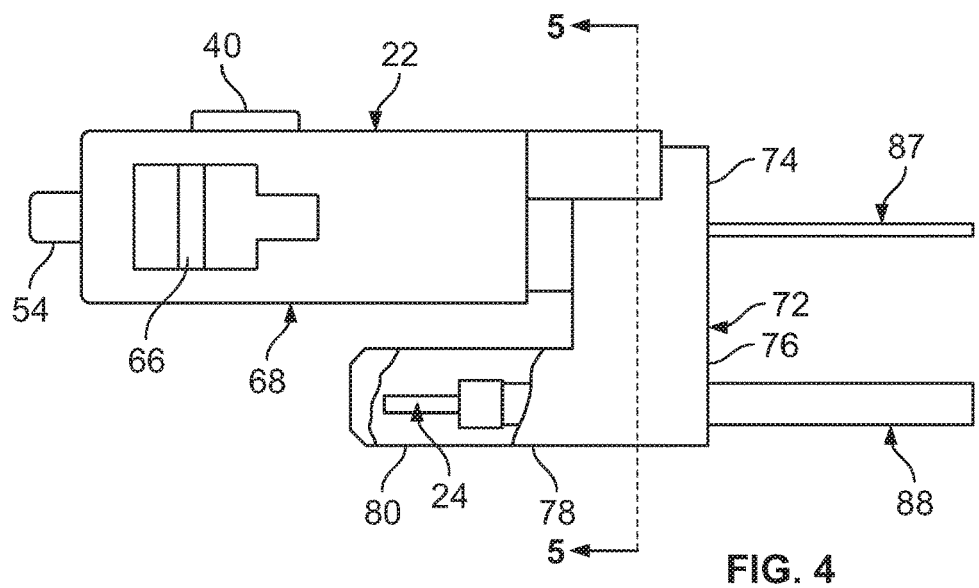
FIG. 4 is another view showing the electrical contact carrying fiber optic connector of FIG. 1.
Figure 5:
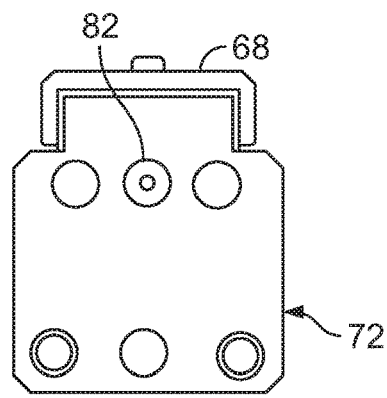
FIG. 5 is a cross-sectional view taken along section line 5-5 of FIG. 4.
Figure 6:
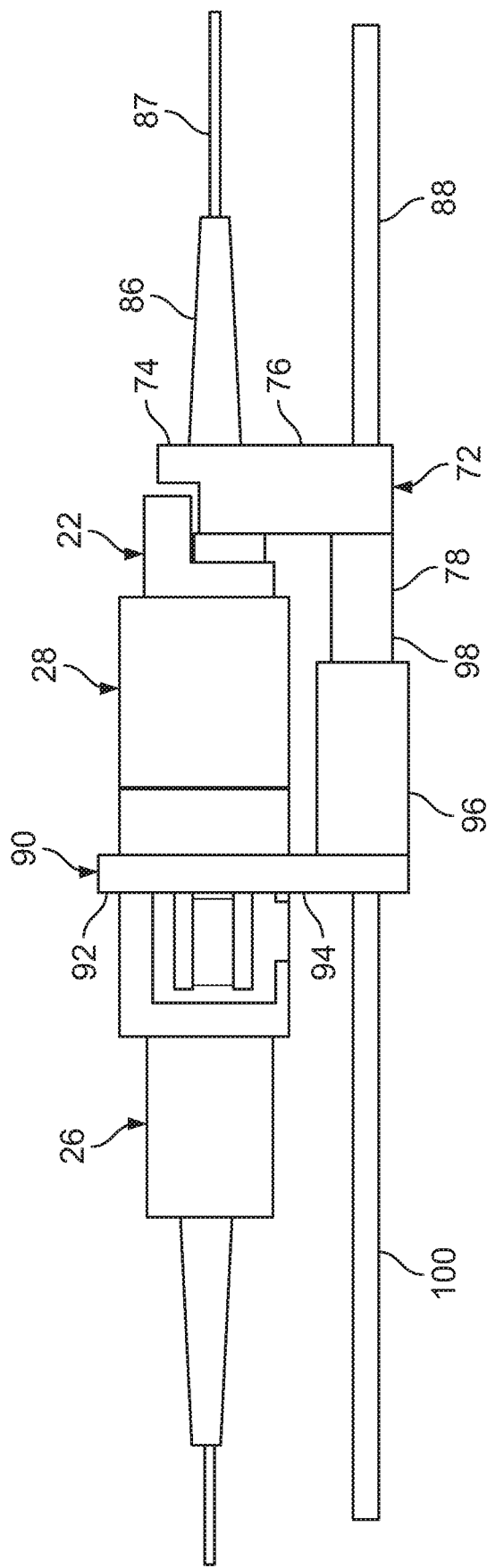
FIG. 6 is another view showing the hybrid system of FIGS. 1 and 2 with the fiber optic connectors coupled together and with the electrical contacts coupled together.
Figure 7:
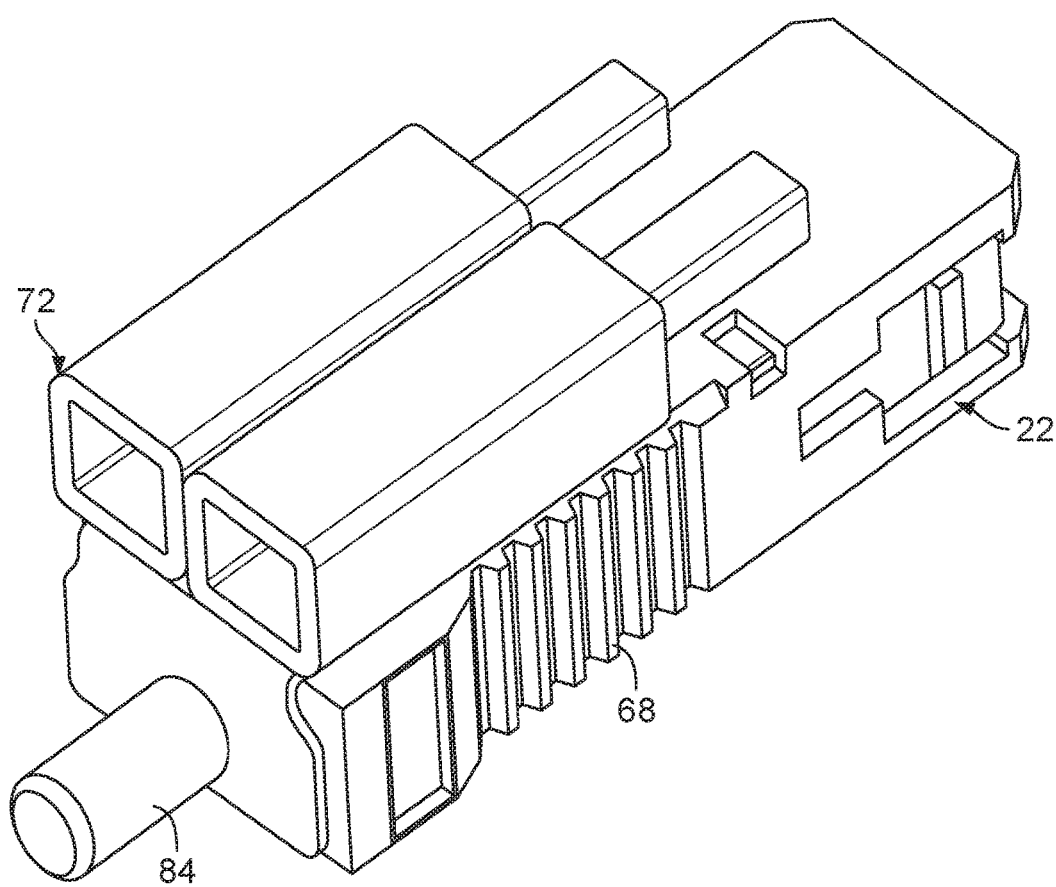
FIG. 7 is another view showing the electrical contact carrying fiber optic connector of FIG. 1.

As shown at FIGS. 1, 4 and 5, the connector electrical contacts 24 are coupled to the first fiber optic connector 22 by a connector contact holder 72 that attaches to the fiber optic connector 22. The connector contact holder includes an attachment portion 74 that attaches to the first fiber optic connector 22, a lateral offset portion 76 that extends laterally outwardly from the fiber optic connector 22 and a forward extension structure 78 that projects forwardly from the lateral offset portion 76 toward the forward plug end 52 of the connector body 50 of the first fiber optic connector 22. The forward extension structure 78 can include connector contact mounts 80. In certain examples, the connector contact mounts 80 can include sleeves in which the connector electrical contacts 24 can be mounted. In certain examples, the connector electrical contacts 24 can be secured within the connector contact mounts 50 by a snap-fit connection or other type of attachment technique.

Referring to FIG. 4, forward extension structure 78 extends from the lateral offset portion 76 along at least a portion of the release sleeve 68. In certain examples, a spacing or gap is defined between the release sleeve 68 and the forward extension structure 78. In certain examples, the connector contact holder 72 and the release sleeve 68 are relatively configured such that the connector contact holder 72 does not interfere with the ability of the release sleeve 68 to move axially relative to the connector body 50. In certain examples, the release sleeve 68 can be shortened, notched or otherwise adapted so as to prevent interference between the connector contact holder 72 and the release sleeve 68.

In certain examples, the connector contact holder 72 can mount directly behind the rear end of the connector body 50. In certain examples, the attachment portion 74 can include an opening 82 that press-fits over the rear extension 70 of the rear piece 60 so as to secure the connector contact holder 72 to the first fiber optic connector 22. In certain examples, the attachment portion 74 can include a rear extension 84 that mounts over the rear extension 70 of the rear piece 60. In certain examples, a boot 86 can be press-fit over the rear extension 84 to provide bend radius protection at a juncture defined between the rear extension 84 and a corresponding cable to which the first fiber optic connector 22 is coupled.

Referring to FIG. 1, the first fiber optic connector 22 is shown terminating the end of a fiber optic cable 86. An optical fiber of the fiber optic cable 86 can have an end portion secured within the ferrule 54 of the first fiber optic connector 22. Strength members (e.g., Aramid yarns, E-Glass, S-Glass or other type of reinforcing structure) corresponding to the fiber optic cable 86 can be anchored to the rear extension 84 of the connector contact holder 72. For example, the strength members can be crimped or otherwise mechanically secured to the rear extension 84. In other examples, the strength members may be secured to the rear extension 70 of the rear piece 60, and the connector contact holder 72 can be mounted over the reinforcing members.

Still referring to FIG. 1, the connector electrical contacts 74 can include contacts such as pins or sockets that are electrically connected to electrical conductors such as wires 88. The wires can include solid or stranded metal conductors (e.g., copper conductors) surrounded by an insulation layer. In certain examples, the wires can be attached to the fiber optic cable 86 by techniques such as slashing, strapping or other techniques. In still other examples, the electrical conductors may be provided within a jacket of the fiber optic cable 86. In still other examples, a separate jacket layer may be used to secure the fiber optic cable 86 to the separate electrical conductors 88.

In certain examples, a portion of a wall of the release sleeve 68 is positioned laterally between the forward extension structure 78 and the connector body 50. In certain examples, the keying rail 40 of the release sleeve 68 is positioned at one side of the release sleeve 68, and the forward extension structure 78 extends forwardly along a second side of the release sleeve 68 that is opposite from the first side.

Referring back to FIG. 1, the adapter electrical contacts 30 are coupled to the adapter body 32 by an adapter contact holder 90 including an attachment portion 92 that attaches to the adapter body 32, a lateral offset portion 94 that projects laterally outwardly from the adapter body 32 and an axial extension structure 96 that extends from the lateral offset portion 94 toward an open end of the first port 34 of the adapter 28. The axial extension structure 96 includes contact mounts 98 such as sleeves for holding the adapter electrical contacts 30. In certain examples, the adapter electrical contacts snap-fit within the contact mounts 98. In certain examples, the adapter contact mounts 98 are configured to fit with the connector contact mounts 80. In certain examples, the connector contact mounts 80 and the adapter contact mounts 98 are configured to telescopically slide relative to one another. The adapter electrical contacts are electrically connected to electrical conductors 100 such as wires. When the first fiber optic connector 22 is inserted into the first port 34 of the adapter 28, the connector contact mounts 80 concurrently mate with the adapter contact mounts 98 such that electrical connections are made between the electrical contacts 24 and the adapter electrical contacts 30. In one example, the adapter electrical contacts 30 include sockets and the connector electrical contacts 24 include pins that are received within the sockets.

In certain examples, the attachment portion 92 of the adapter contact holder 90 mounts about the exterior of the adapter body 32. As depicted at FIG. 1, the attachment portion 92 is captured between the external shoulder 46 of the adapter body 32 and the leaf spring structures 48.

Aspects of the present disclosure relate to hybrid connection systems that facilitate the fast, low cost and simple deployment of optical fiber and power to interface with active devices. In certain examples, the hybrid connectivity system can provide power and optical signals to active devices in a local area network (LAN). In certain examples, the active devices can include optical network terminals (ONT) within a building. The ONTs can be located at or near desktop locations. The ONTs can include circuitry for providing optical-to-electrical and electrical-to-optical signal conversion. The ONTs can be coupled to active devices such as computing devices. In other examples, the active devices can include devices for generating wireless communication coverage areas (e.g., wireless transceivers) and other active devices (e.g., cameras, computing devices, monitors, etc.). In still other examples, systems in accordance with the principles of the present disclosure can provide power and fiber optics to a power-over-Ethernet extender. The power-over-Ethernet extender can include optical-to-electrical conversion circuitry for converting optical signals to electric signals that are transmitted through copper cabling such as twisted pair cabling. Electrical power provided to the power-over-Ethernet extender can be directed over the twisted pair cabling to provide power in a power-over-Ethernet format.

Figure 9:
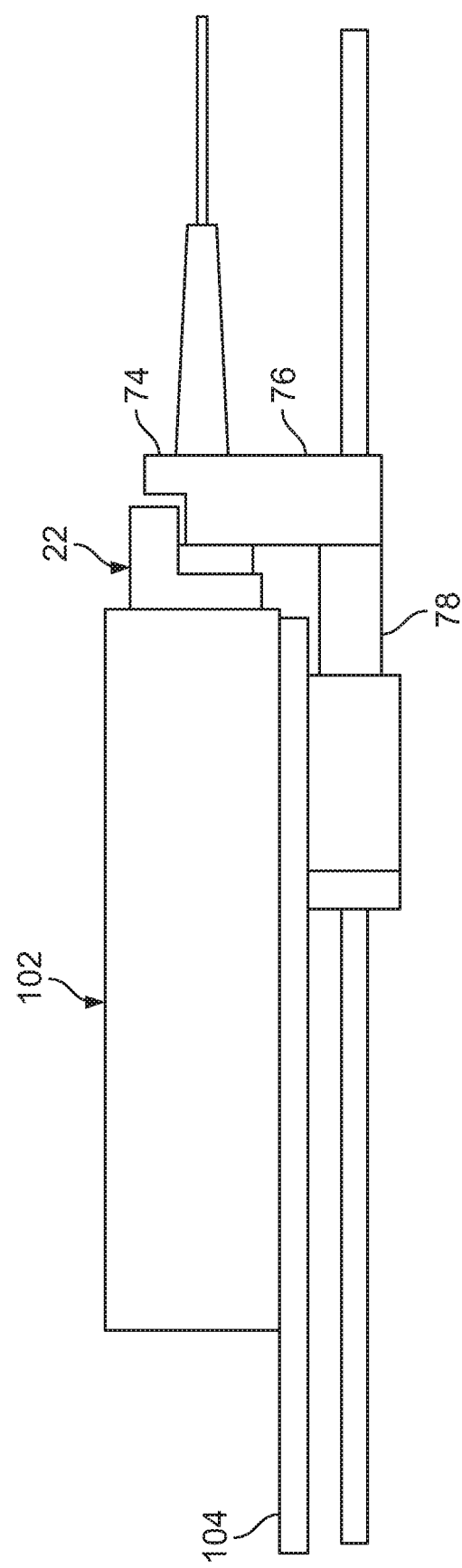
FIG. 9 shows the electrical contact carrying fiber optic connector of FIG. 1 coupled to a circuit board mounted small form-factor pluggable transceiver.
Figure 10:
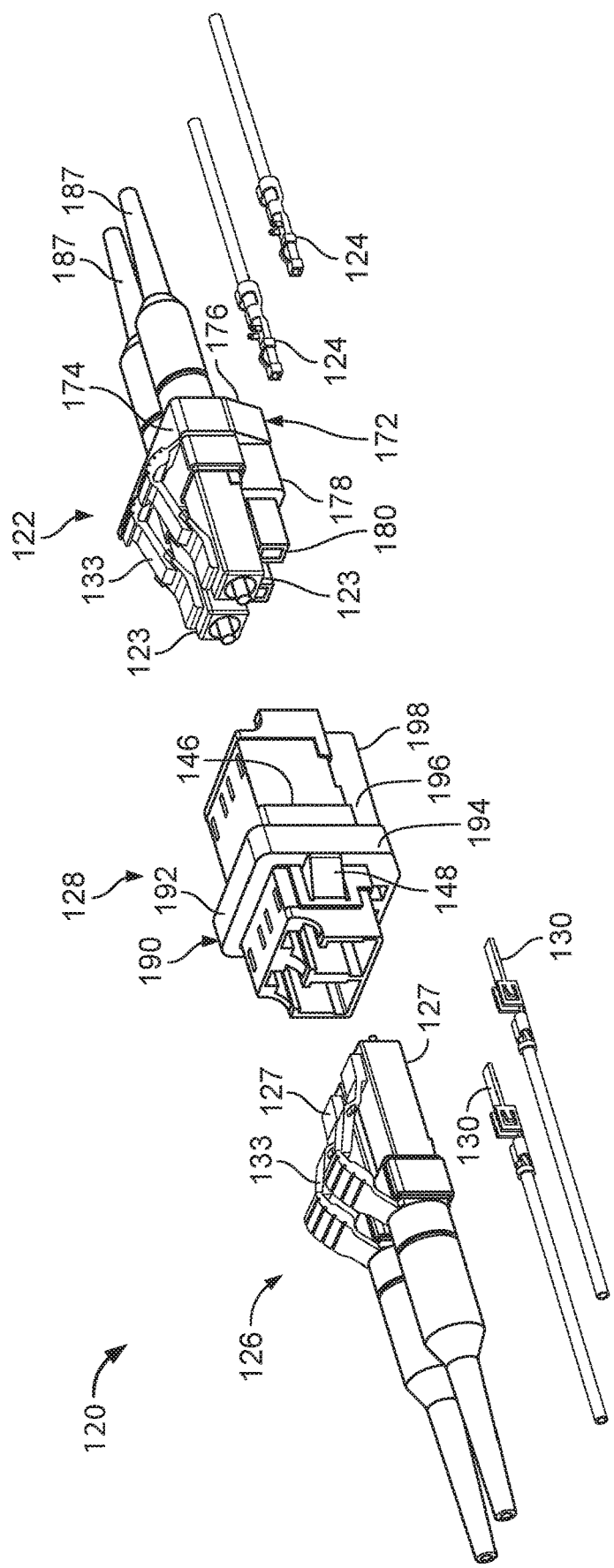
FIG. 10 illustrates another hybrid connection system in accordance with the principles of the present disclosure.
Figure 11:
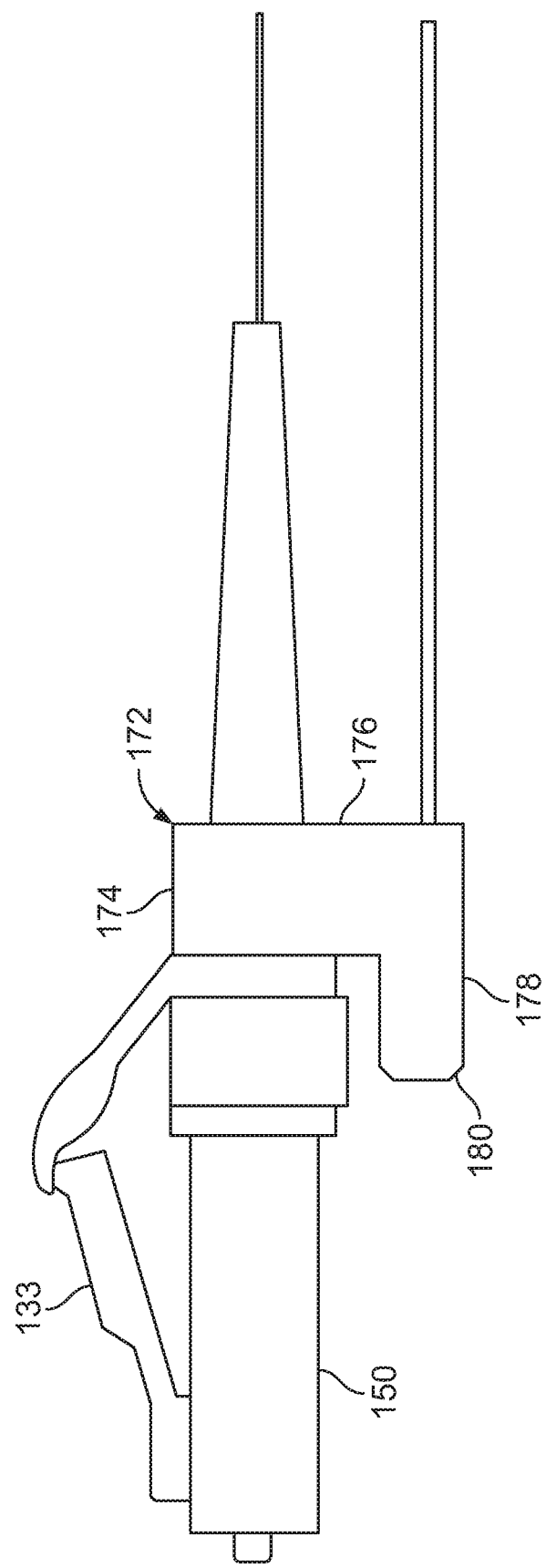
FIG. 11 illustrates an electrical contact carrying duplex plug arrangement of the hybrid system of FIG. 10.
Figure 12:
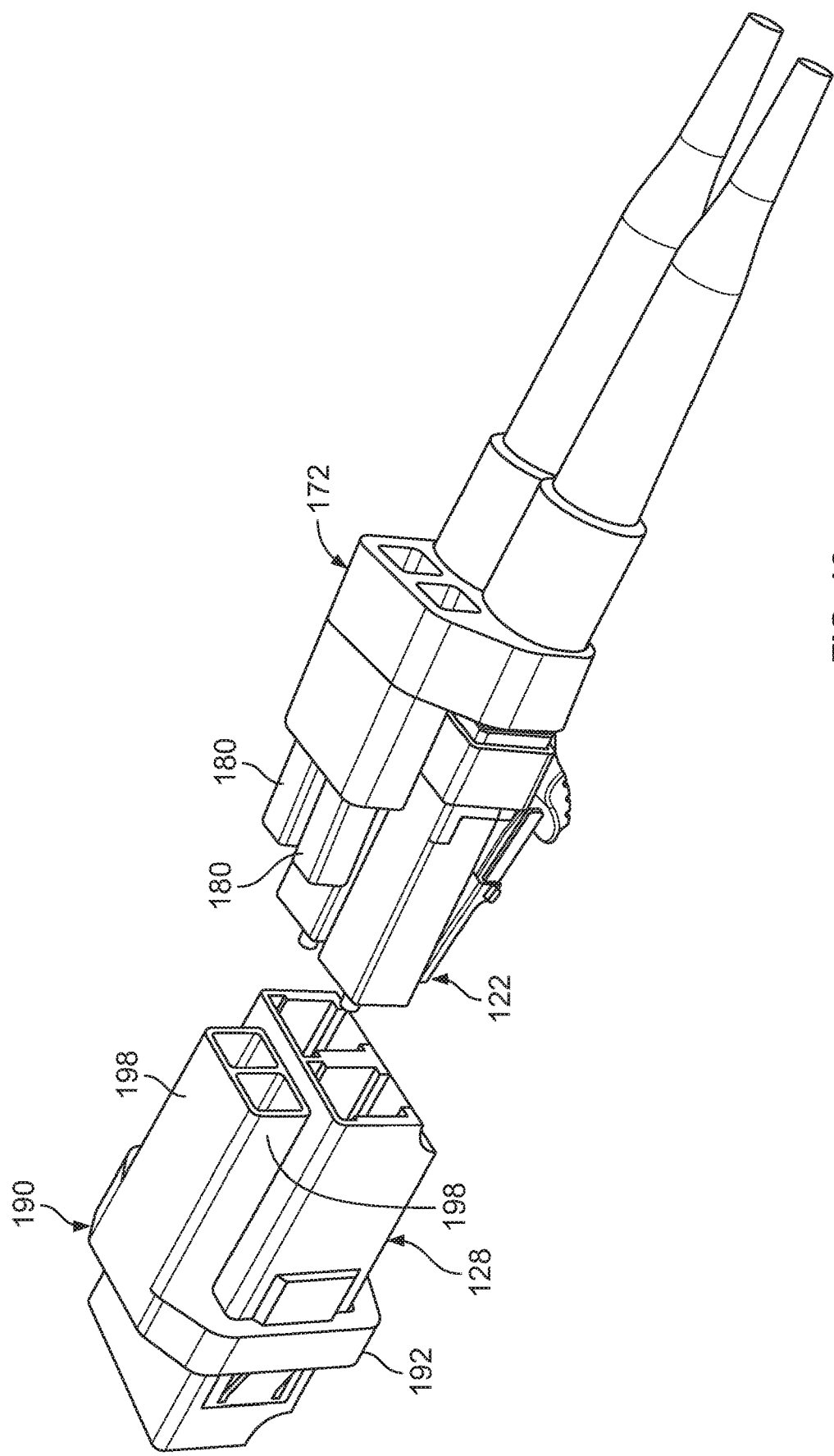
FIG. 12 is another view of the hybrid connection system of FIG. 10.

FIG. 9 shows the first fiber optic connector 22 and the corresponding connector electrical contacts 24 coupled to an active device such a small form-factor pluggable transceiver 102. The transceiver 102 can have a port for receiving and optically connecting to the first fiber optic connector 22. In certain examples, the transceiver 102 can have a circuit-board mounted configuration including a circuit board 104. Electrical contacts 106 can be electrically connected to the circuit board. The circuit board can include tracings that direct power to optical-to-electrical conversion circuitry. The transceiver 102 can include electronics for generating a wireless area network. The electrical contacts can be configured to electrically connect to the connector electrical contacts 24 when the first fiber optic connector 22 is inserted within the port of the transceiver.

FIGS. 10-13 illustrate another hybrid optical and electrical connection system 120 in accordance with the principles of the present disclosure. The system 120 includes a first duplex connector arrangement 122 including two fiber optic plugs 123. The duplex connector arrangement 122 carries a pair of connector electrical contacts 124. The system 120 also includes a second duplex connector arrangement 126 including two fiber optic plugs 127. The system 120 further includes a duplex fiber optic adapter 128 for coupling the first and second duplex connector arrangements 122, 126 together. A pair of adapter electrical contacts 130 are mounted to the duplex fiber optic adapter 128. When the first duplex connector arrangement 122 is coupled to the duplex fiber optic adapter 128, the connector electrical contacts 124 carried with the first duplex connector arrangement 124 make electrical connections with the adapter electrical contacts 130 mounted to the duplex fiber optic adapter 128.

The duplex fiber optic adapter 128 includes an adapter body 132 defining first ports 134 for receiving the fiber optic plugs 123 and second ports 136 for receiving the fiber optic plugs 127. Ferrule alignment sleeves are positioned within the duplex fiber optic adapter 128 for coaxially aligning optical ferrules corresponding to the fiber optic plugs 123, 127. The adapter body 132 further includes catches that engage with corresponding latches 133 of the fiber optic plugs 123, 127 for retaining the fiber optic plugs 123, 127 within their corresponding ports 134, 136.

Figure 13:
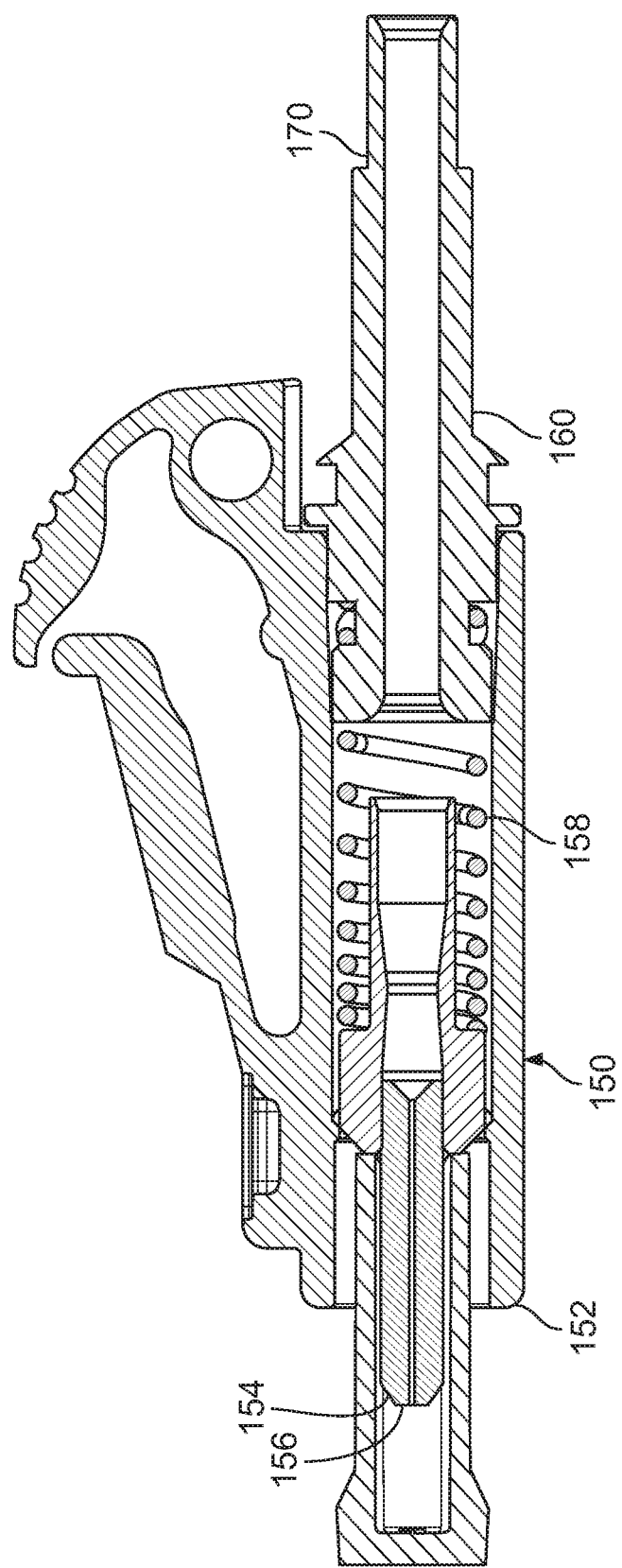
FIG. 13 is cross-sectional view showing a ferrule, a ferrule hub, spring, a connector body and a rear spring holder of one of the connectors\plugs of the duplex plug arrangement of the hybrid connection system of FIG. 10.

Referring to FIG. 13, each of the fiber optic plugs 123, 127 includes a connector body 150 having a forward plug end 152. A ferrule 154 is mounted within the connector body 150. The ferrule has a ferrule end face 156 that is accessible at the forward plug end 152 of the connector body 150. A spring is provided for biasing the ferrule 154 in a forward direction relative to the connector body 150. A rear piece 160 is secured to a rear end of the connector body 150. The rear piece 160 functions as a spring stop for retaining the spring 158 within the connector body 150. The rear piece 160 has a rear extension 170 that projects rearwardly beyond the rear end of the connector body 150. The latch for containing the connector within its corresponding adapter port is integrally connected with the connector body 150.

The connector electrical contacts 124 are secured to the first duplex connector arrangement 122 by a connector contact holder 172. The connector contact holder 172 includes an attachment portion 174 that is mounted directly behind the connector body 150 and that is press-fit over the rear extensions 170 of the rear pieces 160 of the fiber optic plugs 123. The attachment portion 174 can include rear extensions on which tapered boots are mounted. The connector contact holder 172 also includes a lateral offset portion 176 that projects laterally outwardly from the attachment portion 174, and forward extension structure 178 that projects forwardly from the lateral offset portion 176. The forward extension structure 178 is positioned at an opposite side of the connector body 150 from the connector latch. The forward extension structure 178 includes connector contact mounts 180 for holding the connector electrical contacts 124.

The adapter electrical contacts 130 are secured to the fiber optic adapter 128 by an adapter contact holder 190. The adapter contact holder 190 includes an attachment portion 192 that is secured to the adapter body 132. In one example, the attachment portion 192 is captured between a spring structure 148 and an external shoulder 146 of the adapter body 132. The adapter contact holder 90 further includes a lateral offset portion 194 that projects laterally outwardly from the attachment portion 192, and an axial extension structure 196 that projects axially from the lateral offset portion 194. The axial extension structure 196 includes adapter contact mounts 198 for holding the adapter electrical contacts 130. In certain examples, the adapter contact mounts 98 are configured to mate with the connector contact mounts 180 when the first duplex connector arrangement 132 is mated with the fiber optic adapter 128. The adapter electrical contacts 130 make electrical contact with the connector electrical contacts 124 when the adapter contact mounts 198 and the connector contact mounts 180 are mated.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A connection system comprising:
   a first fiber optic connector that includes a first optical fiber and excludes electrical contacts;
   a second fiber optic connector that includes a second optical fiber and includes electrical contacts; and
   a fiber optic adapter that includes a first end and a second end, wherein the first end of the fiber optic adapter excludes electrical contacts and wherein the second end of the fiber optic adapter includes only one set of electrical contacts with each electrical contact of the only one set having a first end secured within the fiber optic adapter and a second end coupled to a conductor that extends freely from the fiber optic adapter,
   wherein the first end receives the first fiber optic connector at a first port and wherein the first end only receives fiber optic connectors that exclude electrical contacts,
   wherein the second end receives the second fiber optic connector at a second port and at an electrical contact interface, wherein the first and second ports are aligned to optically couple the first and second optical fibers and wherein the electrical contacts of the second fiber optic connector and the first ends of the electrical contacts secured to the fiber optic adapter are electrically coupled.

2. The connection system of claim 1, wherein the second fiber optic connector includes exactly two electrical contacts and wherein the only one set of electrical contacts of the second end of the fiber optic adapter includes exactly two electrical contacts.

* * * * *